United States Patent

Kucera

[11] 3,979,892
[45] Sept. 14, 1976

[54] MACHINE FOR FORMING LARGE ROUND BALES

[75] Inventor: Joseph B. Kucera, Traer, Iowa

[73] Assignee: Rudolph L. Lowell, Des Moines, Iowa; a part interest

[22] Filed: Apr. 21, 1975

[21] Appl. No.: 569,990

[52] U.S. Cl. .................................................. 56/341
[51] Int. Cl.² ........................................... A01D 75/00
[58] Field of Search .......................... 56/341–343, 56/16.4

[56] References Cited
UNITED STATES PATENTS

| | | | |
|---|---|---|---|
| 3,110,145 | 11/1963 | Avery | 56/341 X |
| 3,680,296 | 8/1972 | Beebout | 56/341 X |
| 3,797,215 | 3/1974 | Kopaska | 56/341 |

*Primary Examiner*—JN. Eskovitz
*Attorney, Agent, or Firm*—Rudolph L. Lowell

[57] ABSTRACT

The machine has a rotatable material pickup device movably supported on a portable frame for movement relative to the rear end of the frame to a lowered material pickup position and to an elevated position wherein a formed bale can pass thereunder. A pair of fixed vertically spaced rollers are located forwardly of the pickup device. A third roller is movable longitudinally of the frame in a path above and to opposite sides of the upper one of the rollers and is continuously yieldably urged in a direction toward the front end of the frame. A continuous belt means is initially trained about the pickup device, the bottom fixed roller and the movable roller, with the lower run of the belt means, extended between the pickup device and the bottom fixed roller, lying in a substantially horizontal plane adjacent the ground surface. As the portable frame is advanced along a windrow, the material gathered by the pickup device is engaged by the lower run of the belt means for compaction and rolling on the ground surface. During a bale forming operation the belt lower run is progressively extended about the bale concurrently with the rearward movement of the third roller to train the flexible means about the upper fixed roller. On completion of the bale, the pickup device is elevated and the frame moved away from the ground supported bale.

13 Claims, 10 Drawing Figures

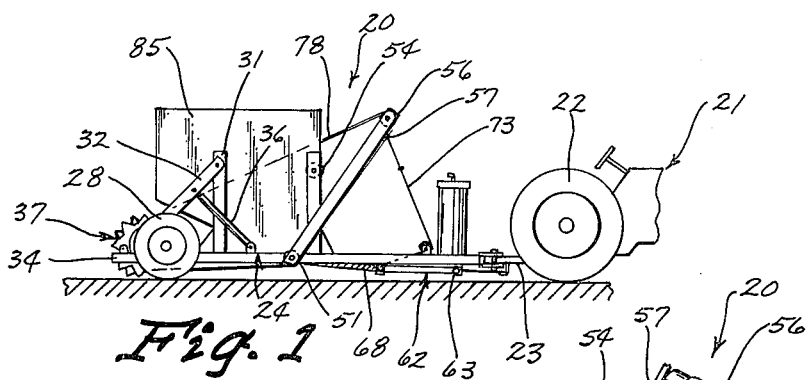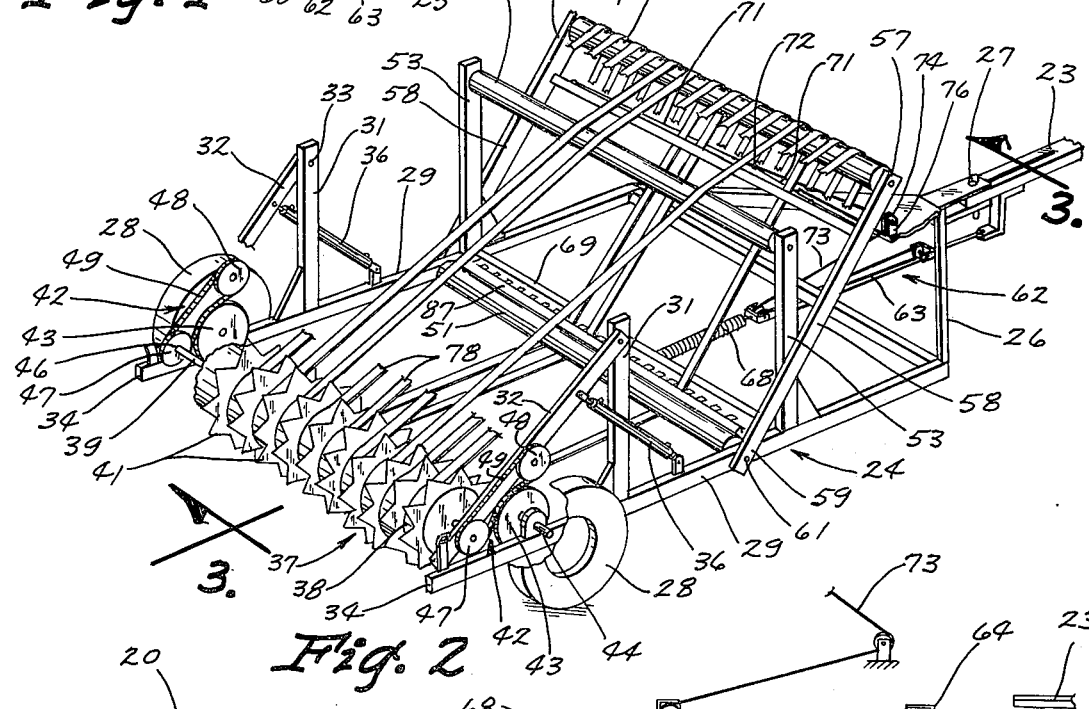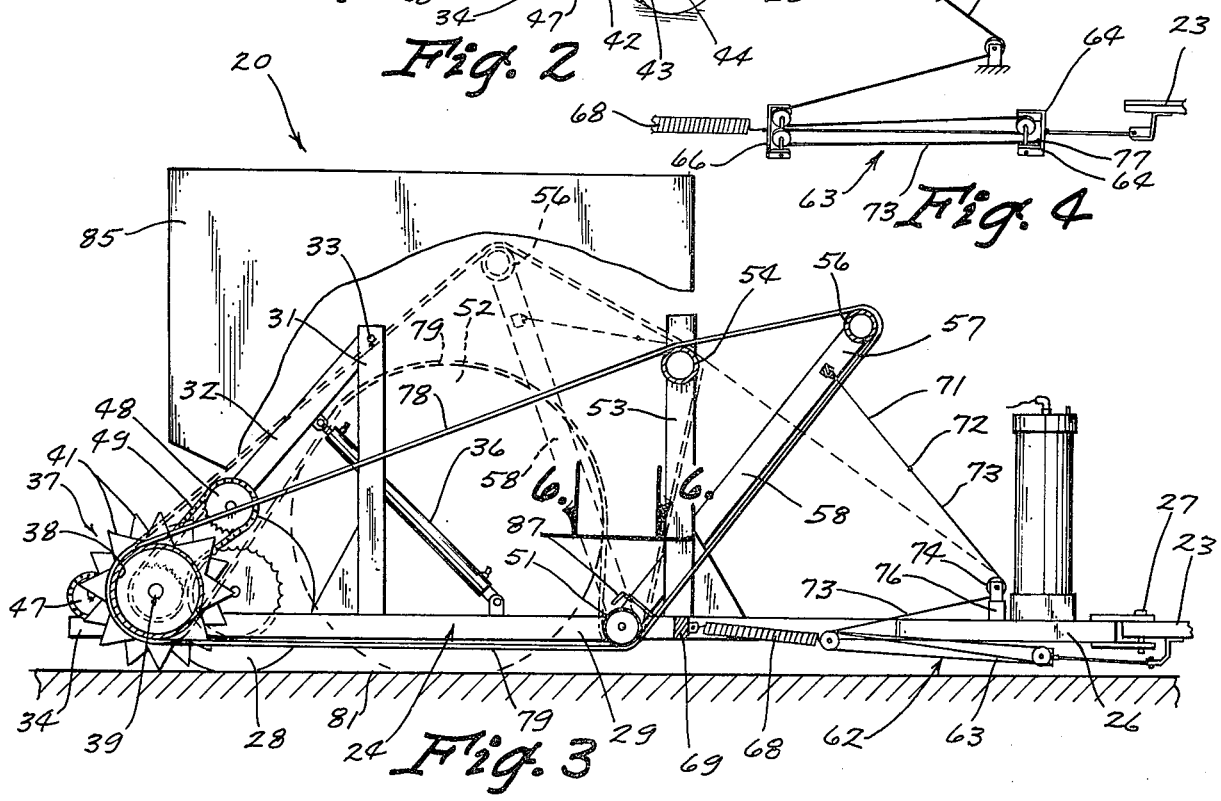

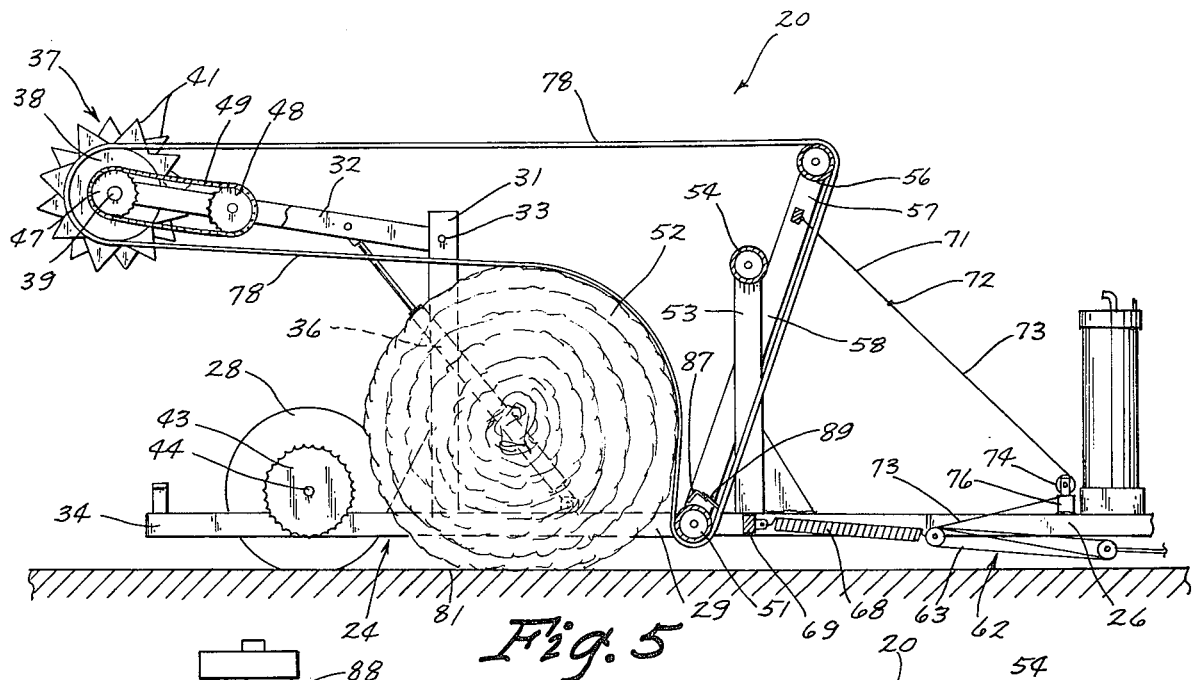

MACHINE FOR FORMING LARGE ROUND BALES

SUMMARY OF THE INVENTION

The baling machine is of a simple and economical construction and efficient in operation to form a large round compact bale capable of being readily transported to feed and storage locations and of withstanding weather conditions when left in the field. The pickup device is driven from a ground wheel of the machine and rotated at a peripheral speed substantially equal to the linear speed of travel of the machine. Loss of leaves from the material being baled and usually resulting from a too aggressive rotation of the bale, is substantially eliminated. The extension of the lower run of the belt means about the upper peripheral portion of the bale provides for a uniform compaction and resultant uniform density of the formed bale. The amount of compaction, and in turn the density of the completed bale, may be controlled by varying the yieldable pressure acting to continuously urge the movable roller in a forward direction.

BRIEF DESCRIPTION OF THE DRAWINGS

FIG. 1 is a side elevational view of the bale forming machine of this invention shown in a towed relation with a usual farm tractor, only the rear end portion of which is illustrated;

FIG. 2 is a perspective view of the baling machine with parts thereof removed to more clearly show its construction;

FIG. 3 is an enlarged sectional view taken substantially along line 3—3 in FIG. 2, showing the machine with the parts thereof in a bale forming position;

FIG. 4 is a diagrammatic showing of a block and tackle device that forms part of a belt tensioning device;

FIG. 5 is illustrated similarly to FIG. 3 and shows the machine with the parts thereof in changed positions providing for the discharge of a completed bale from the machine;

FIG. 6 is an enlarged detail sectional view on line 6—6 in FIG. 3;

FIG. 7 is a sectional view taken on line 7—7 in FIG. 6;

FIG. 8 is a diagrammatic illustration of the machine showing the start of a bale forming operation;

FIG. 9 is illustrated similarly to FIG. 8 and shows the bale partially formed; and FIG. 10 is illustrated similarly to FIG. 9 and shows the bale finally formed;

DETAILED DESCRIPTION OF THE INVENTION

With reference to FIG. 1 of the drawing, the round bale forming machine of this invention, indicated generally at 20, is shown in assembly relation with a farm tractor 21 having rear traction wheels 22 and a rear draw bar 23. The baling machine 20 is shown as being of a pull-type and includes a portable frame 24 (FIG. 2) of a generally U-shape, open at its rear end, and having a forwardly projected tongue structure 26 connected by a hitch pin 27 with the tractor draw bar 23. The frame 24 is supported on a pair of rear ground wheels 28 corresponding to and rotatably supported on the side members 29 of the portable frame 24.

Arranged forwardly of the ground wheels 28 and projected upwardly from each side member 29 is a rear upright support 31. Corresponding to these rear supports 31 are a pair of rearwardly extended pivot arms 32 the forward ends of which are pivoted at 33 to the upper ends of the rear supports 31. The rear ends of the pivot arms 32 are pivotally movable up and down relative to the rear ends 34 of the side members 29 to a lowered position in resting engagement on the side members 29 and to an elevated position projected in a substantially horizontal plane rearwardly from the rear supports 31. The pivot arms 32 are raised and lowered by corresponding hydraulic cylinder assemblies 36, each of which extends between and is connected to a side member 29 and an associated pivot arm 32.

A material pickup device 37 extends transversely between the rear ends of the pivot arms 32 and includes a cylindrical body member 38 that has an axially extended shaft 39 rotatably supported at the rear ends of the pivot arms 32. Material pickup members 41 of a generally triangular shape in side elevation are arranged in circumferential rows spaced axially of the body member 38. For a more detailed description of the pickup device 37, reference is made to U.S. Pat. No. 3,815,344.

The pickup device 37 is driven from the ground wheels 28 by corresponding drive means 42 each of which includes a drive sprocket 43 mounted on a wheel shaft 44 at a position inwardly of a side member 29. Each end 46 of the shaft 39 of the pickup device 37 extends through and projects laterally outwardly from an associated pivot arm 32. A sprocket gear 47 mounted on a projected shaft end 46 is arranged in a plane common to a drive sprocket 43 and an idler sprocket 48 rotatably supported on a pivot arm 32 at a position forwardly of a sprocket gear 47. A sprocket chain 49 trained about the sprockets 47 and 48 is engageable with the drive sprocket 43, on the portable frame 24, when the pivot arms 32 are moved to lower the pickup device 37 to its pickup position extended between the rear ends 34 of the side members 29. The gears 43 and 47 are of a relative size such that the peripheral speed of the pickup device 37 is substantially equal to the linear speed of forward travel of the portable frame 24.

Spaced forwardly from the rear upright supports 31 and extended between and rotatably supported on the side members 29 is a fixed bottom transverse roller 51 (FIG. 3). The pickup device 37 and the bottom roller 51 are spaced a distance apart to receive therebetween a completed bale which is indicated at 52. Stated otherwise, the area enclosed by the pickup device 37, bottom roller 51 and side members 29 defines a baling zone for the bale being formed.

Located adjacent to and forwardly of the bottom roller 51 are a pair of front upright supports 53, each of which is carried on a corresponding side member 29. A fixed upper transverse roller 54 extends between and is rotatably supported at the upper ends of the front supports 53 so as to be in a vertically spaced position relative to the bottom roller 51 such that the axis of the upper roller 54 is substantially at the level of the top side of the completed bale 52.

A transversely extended movable roller 56 extends between and is rotatably supported at the free or upper ends 57 of a pair of pivoted arm members 58 which are arranged to the outside of the frame side members 29. The pivoted arms 58 are shown as having their lower ends pivotally supported on the projected end sections 59 of the shaft 61 for the bottom roller 51 (FIGS. 2 and 3). It is to be understood, however, that the pivot arms 58 may also be pivotally supported on the side members 29 at positions adjacent to the front upright supports 53.

The pivot arms 58 are of a length greater than the height of the front supports 53 to provide for a pivotal movement of the movable roller 56 longitudinally of the frame 24 and in a path above and to opposite sides of the roller 54. The pivoted arms 58, and in turn movable roller 56, are continuously and yieldably urged in a direction toward the front end of the frame 24 by a tensioning mechanism, indicated generally at 62 in FIG. 3. This mechanism includes a usual block and tackle device 63 (FIG. 4) having end sheave assemblies 64 and 66 to be hereinafter referred to as the front sheave assembly and rear sheave assembly, respectively.

The front sheave assembly 64 is secured to an anchor bar 67 projected downwardly from the tractor draw bar 23. The rear sheave assembly 66 is attached to the front end of a coil spring 68 the rear end of which is secured to a transverse connecting member 69 (FIG. 2) extended between and connected to the frame side members 29. As shown in FIG. 2, the block and tackle device 63 and coil spring 68 extend longitudinally of the frame 24 at a central position between the side members 29. A cable system which forms part of the tension mechanism 62 includes a cable attachment of a V-shape having the free ends of its leg sections 71 secured to corresponding ones of the pivot arms 58 adjacent the upper ends thereof. The apex of the V-shape cable attachment is connected at 72 to one end of a cable 73 which from such end is trained about a pulley 74 that is rotatably supported in a bracket member 76 projected upwardly from the tongue structure 26 of the portable frame 24. The cable 73 is then operatively associated with the sheave assemblies 64 and 66 of the block and tackle device 63, as shown in FIG. 4, for attachment of its opposite end 77 to the front sheave assembly 64.

It is seen, therefore, that the coil spring 68 functions to continuously pull the pivot arms 58 in a direction toward the front end of the portable frame 24 and with the block and tackle mechanism 63 providing for a reduced extension of the coil spring 68 relative to the movement of the roller 56 longitudinally of the frame 24. As a result, a relatively heavy and short coil spring can be utilized to counteract the movement of the roller 56 longitudinally of the portable frame 24. The action of the tension mechanism 62 functions to maintain under tension a plurality of flexible members or flat belts 78 that are spaced transversely of the frame 24 for operative association with the rollers 51, 54 and 56 and the pickup device 37.

When a bale is to be formed the pickup device 37 (FIG. 3) is in its lowered position shown in FIGS. 2 and 3 wherein the belts 78 are trained about the body member 38 of the pickup device 37 at positions between the circumferential rows of the pickup members 41, and about the bottom roller 51 and movable roller 56. At the start of a baling operation, therefore, it is seen that the lower runs 79 of the belts 78, extended between the pickup device 37 and bottom roller 51, lie in a substantially horizontal plane adjacent to the ground surface, indicated at 81, and in turn to the windrowed fibrous material which is to be baled. During the baling operation, the lower belt runs 79 are extended upwardly between the pickup device 37 and bottom roller 51 in engagement with the upper peripheral portion of the bale being formed in response to the increase in the size of the bale. This extension of the belt lower runs 79 about the bale is permitted by the progressive rearward movement of the pivot arms 58 from the full line positions thereof in FIG. 3 to their dotted line positions, shown in the same figure.

During this rearward movement of the pivot arms 58, the belt portions between the bottom roller 51 and movable roller 56 are trained about the upper fixed roller 54. In this respect, it is to be noted that the belts 78 may be in contact or resting engagement with the roller 54 at the start of a baling operation, as shown in FIG. 3. This relative arrangement of the rollers 51, 54 and 56 provides for the belts 78 being in continuous engagement with the upper peripheral portions of a bale, with the use of relatively short pivot arms 58 that are movable relatively short distances in paths longitudinally of the portable frame 24.

In the operation of the baling machine 20, let it be assumed that the pickup device 37 and the belt engaging rollers are in their relative positions shown in FIG. 8 at the commencement of a baling operation. On a forward advance of the tractor 21, as indicated by the arrow 82 in FIG. 8, the pickup 37 is rotated in a counterclockwise direction, as viewed in the same figure, whereby the windrowed material 83 is gathered forwardly of the pickup device for engagement by the lower runs 79 of the belts 78. The gathered material 84 is then rolled in a clockwise direction, as viewed in FIG. 8, on top of the windrowed material 83 and within the previously defined baling zone. The bale is confined laterally within the baling zone by upright side plates 85 (FIGS. 1 and 3) carried on the frame side members 29.

Concurrently with the rolling action on the bale by the belt runs 79, the bale 86 (FIG. 9) being formed is compacted by the tension force applied to the belts 78 by the tension mechanism 62. This compacting force is continuously applied to the forming bale 86, in a direction toward the ground surface 81, during the complete baling operation. Thus, as shown in FIG. 9, for an intermediate size of the forming bale 86, the lower belt runs 79 are engageable with an upper peripheral portion of the bale. However, as the bale size increases and, as shown in FIG. 10, the belt engagement with the bale is progressively increased so that when the bale is completed the belt runs 79 are in peripheral engagement with the upper half portion of the bale. It is apparent, therefore, that the compacting and rolling action of the belts 78 on a bale is maintained during the entire baling operation.

At times there is a tendency for the gathered material to wrap itself about the bottom roller 51. To reduce this wrapping tendency (FIGS. 6 and 7) there is provided a material removing element which consists in arranging a V-shape member 87 at a position above and adjacent to the upper side of the bottom roller 51. As shown, the member 87 is extended between and secured to the pivot arms 58. The leg member 88 of the member 87 functions essentially as a scraper element relative to the bottom roller 51 and is provided with spaced finger extensions 89 of a length to extend between adjacent belt members 78. Thus, any material tending to travel with the belts 78 is removed by the fingers 89 and with the material tending to adhere to the peripheral surface of the roller 51 being removed by the scraping function of the leg member 88.

Although the invention has been described with respect to a preferred embodiment thereof, it is to be understood that it is not to be so limited since changes and modifications can be made therein which are within the full intended scope of this invention as defined by the appended claims.

I claim:

1. A machine for forming a round bale of a windrowed fibrous material comprising:
   a. a portable frame having a front end and a rear end and including a pair of transversely spaced side members,
   b. a pair of transversely extended rollers rotatably supported at fixed positions on said portable frame, with a first one thereof extended between said side members and the second one thereof located upwardly from said first roller,
   c. a third transversely extended roller,
   d. means supporting said third roller on said portable frame for movement longitudinally of the portable frame in a path above said second roller,
   e. a transversely extended pickup device positioned between said side members adjacent the rear ends thereof when a bale is being formed,
   f. the second roller being supported above the ground surface at a height approximately equal to the distance between the pickup device and first roller when a bale is being formed,
   g. means for yieldably urging the supporting means for said third roller toward the front end of said portable frame,
   h. a continuous flexible means trained about said pickup device and said first and third rollers when a bale is to be formed, and about said three rollers when a bale has been formed, said flexible means having a lower run extended between the pickup device and said first roller, and
   i. means for rotating said pickup device in a direction counter to the advance of said portable frame and along the windrowed material to gather material forwardly thereof for engagement by said lower run, with the engaged material being rolled and compacted on the ground surface within a bale-forming zone located between the pickup device and said first transverse roller and between said side members.

2. A machine for forming a round bale according to claim 1 wherein:
   a. said supporting means for the third roller includes a pair of upright pivoted members corresponding to and arranged to the outside of said side members, and
   b. means pivoting said upright members at the lower ends thereof on said side members for pivotal movement about a common transverse axis positioned adjacent to and parallel with the axis of said first roller,
   c. said third roller extended between and rotatably supported adjacent the upper ends of said pair of pivoted members.

3. A machine for forming a round bale according to claim 1 wherein:
   a. said lower run of the flexible means, when a bale is to be formed, lying in a substantially horizontal plane adjacent the upper surface of the windrowed fibrous material.

4. A machine for forming a round bale according to claim 1 wherein:
   a. said supporting means for the third roller is movable toward the rear end of the portable frame in response to the extension of the lower run of the flexible means upwardly between said pickup device and first transverse roller by the progressive increase in the size of the bale being formed.

5. A machine for forming a round bale according to claim 1 wherein:
   a. said continuously urging means includes an extensible and contractible cable system having one end portion thereof secured to the supporting means for said third roller and an opposite end portion thereof secured adjacent the front end of said portable frame, and
   b. a coil spring connected in tension to said cable system and to said portable frame acting to extend said cable system.

6. A machine for forming a round bale according to claim 5 wherein:
   a. said cable system includes a block and tackle device interconnecting said coil spring and said opposite end portion.

7. A machine for forming a round bale according to claim 5 wherein:
   a. the front end of said portable frame is connectible to a tractor having a draw bar,
   b. hitch means for connecting said front end to the tractor draw bar,
   c. said cable system including a block and tackle device having one end portion connected to said coil spring and an opposite end portion connected to said draw bar, and
   d. said block and tackle device extended longitudinally of said portable frame below the front end thereof, and said coil spring extended longitudinally of and rearwardly of said block and tackle device.

8. A machine for forming a round bale according to claim 1, including:
   a. means movably mounting the pickup device on said portable frame for movement from the position thereof extended between said side members to an elevated position providing for the passage thereunder of a formed bale.

9. A machine for forming a round bale of a windrowed fibrous material comprising:
   a. a portable frame having a front end and a rear end and including a pair of transversely spaced side members,
   b. a pair of transversely extended rollers rotatably supported at fixed positions on said portable frame, with a first one thereof extended between said side members and the second one thereof located upwardly from said first roller,
   c. a third transversely extended roller,
   d. means supporting said third roller on said portable frame for movement longitudinally of the portable frame in a path above said second roller,
   e. a transversely extended pickup device positioned between said side members adjacent the rear ends thereof when a bale is being formed,
   f. the second roller being supported above the ground surface at a height approximately equal to the distance between the pickup device and first roller when a bale is being formed,
   g. means for yieldably urging the supporting means for said third roller toward the front end of said portable frame,
   h. a continuous flexible means trained about said pickup device and said first and third rollers when a bale is to be formed, and about said three rollers when a bale has been formed, said flexible means having a lower run extended between the pickup device and said first roller, i. means for rotating said pickup device in a direction counter to the advance of said portable frame and along the windrowed material to gather material forwardly thereof for engagement by said lower run, with the engaged material being rolled and compacted on the ground surface within a bale-forming zone located between the pickup device and said first transverse roller and between said side members, j. means movably mounting the pickup device on said portable frame for movement from the position thereof extended between said side members to an elevated position providing for the passage thereunder of a formed bale, k. a pair of transversely opposite ground wheels rotatably supported on said portable frame adjacent the rear end thereof, and l. means for connecting at least one of said ground wheels in a driving relation with said pickup device, when the pickup device is in the position therefor extended between said side members.

10. A machine for forming a round bale according to claim 9 wherein:

a. said connecting means includes a first rotary member on said pickup device at one end thereof rotatable with said pickup device about the axis thereof, b. a second member on one of said ground wheels rotatable with said one ground wheel about the axis thereof, and c. means on said pickup device mounting means for driving said first rotary member from said second rotary member when the pickup device is in the position therefor extended between said side members.

11. A machine for forming a round bale according to claim 10 wherein:

a. said first and second rotary members are of a relative size to provide for the pickup device being rotated at a peripheral speed substantially equal to the forward speed of the portable frame.

12. A machine for forming a round bale of windrowed fibrous material comprising:

a. a portable frame having a front end and a rear end and including a pair of transversely spaced side members, b. a first transversely extended roller rotatably supported on said portable frame at an elevated position intermediate the ends of the portable frame, c. an upright transversely extended pivoted frame having the lower end thereof pivotally supported on said side members for pivotal movement of the upper end thereof in an arcuate path longitudinally of the portable frame and above said first roller, d. second and third transversely extended rollers rotatably supported at opposite ends of said pivoted frame, e. a transversely extended material pickup device, f. means supporting said pickup device on said portable frame for up and down movement relative to the rear end of said portable frame to a lowered position between said side members and to a raised position providing for the passage of a formed bale thereunder, g. continuous flexible members trained about said pickup device and the second and third rollers on said pivoted frame when a bale is to be formed, and about said pickup device and said first, second and third rollers when a bale has been formed, said flexible members having lower runs extended between said pickup device and the transverse roller adjacent the lower end of said upright pivoted frame, h. means rotating said pickup device in a direction counter to the advance of said portable frame along the windrowed material to gather the material forwardly thereof for engagement by said lower runs of the flexible members, with the engaged material being compacted and rolled forwardly on the ground surface between said side members to form a round bale, and i. means for yieldably urging said pivoted frame in a direction toward the front end of said portable frame to maintain said flexible members under tension.

13. A machine for forming a round bale of windrowed fibrous material comprising:

a. a portable frame having a front end and a rear end and including a pair of transversely spaced side members, b. a front transversely extended roller rotatably supported on said portable frame intermediate the ends thereof at an elevated position, c. a second transversely extended roller rotatably supported on said side members at a position adjacent to and rearwardly of a transverse plane extended through the axis of the first roller, d. a third transversely extended roller, e. means supporting said third roller on said portable frame for pivotal movement longitudinally of said portable frame in an arcuate path above said first roller, f. a transversely extended rotatable material pickup device, g. means movably supporting said pickup device on said portable frame for movement relative to the rear end thereof to an elevated position providing for the travel thereof over a formed bale, and to a lowered material pickup position extended between the side members, h. the front roller being supported at a height above the ground surface similar to the distance between the second roller and material pickup device in its lowered position, i. continuous flexible members trained about said pickup device and said second and third rollers when a bale is to be formed, and about said pickup device and all three of said rollers when a bale has been formed, said flexible members having lower runs extended between said pickup device and said second roller, j. said pickup device, on advance of said portable frame along the windrowed material, gathering the material for engagement by said lower runs, with the engaged material being compacted and rolled on the ground surface forwardly of the pickup device and between said side members to form a round bale, and k. means for yieldably urging the supporting means for said third roller toward the front end of said portable frame, said third roller being progressively rearwardly movable in said arcuate path by the extension of said lower runs in response to the increase in size of a bale being formed.

* * * * *